US006971171B2

(12) United States Patent
Komuro et al.

(10) Patent No.: US 6,971,171 B2
(45) Date of Patent: Dec. 6, 2005

(54) METHOD FOR MANUFACTURING AN INK JET RECORDING HEAD

(75) Inventors: Hirokazu Komuro, Kanagawa (JP); Masashi Miyagawa, Kanagawa (JP); Yoshinori Misumi, Tokyo (JP); Masahiko Kubota, Tokyo (JP); Hiroyuki Sugiyama, Kanagawa (JP); Ryoji Inoue, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 104 days.

(21) Appl. No.: 10/645,582

(22) Filed: Aug. 22, 2003

(65) Prior Publication Data

US 2004/0056928 A1 Mar. 25, 2004

Related U.S. Application Data

(62) Division of application No. 10/214,105, filed on Aug. 8, 2002, now Pat. No. 6,663,229.

(30) Foreign Application Priority Data

Aug. 10, 2001 (JP) ....................................... 2001-243299
Jul. 25, 2002 (JP) ....................................... 2002-216166

(51) Int. Cl.[7] .............................. B23P 17/00; B41J 2/05

(52) U.S. Cl. ....................... 29/890.1; 29/610.1; 29/611; 29/832; 29/848; 29/856; 347/65; 264/221; 264/225

(58) Field of Search ................................ 29/890.1, 611, 29/832, 848, 856, 610.1; 347/65, 63, 67, 94, 61, 20; 264/221, 225, 255, 279

(56) References Cited

U.S. PATENT DOCUMENTS

| | | | | |
|---|---|---|---|---|
| 4,775,445 A | * 10/1988 | Noguchi | ....................... | 216/27 |
| 5,030,317 A | * 7/1991 | Noguchi | ....................... | 216/27 |

(Continued)

FOREIGN PATENT DOCUMENTS

| | | | |
|---|---|---|---|
| EP | 1 005 996 | 6/2000 | |
| EP | 1 057 637 | 12/2000 | |
| EP | 1 057 642 | 12/2000 | |
| JP | 54-51837 | 4/1979 | |
| JP | 06-143578 | * 5/1994 | .............. B41J/2/05 |
| JP | 09-011469 | * 1/1997 | .............. B41J/2/05 |

*Primary Examiner*—A. Dexter Tugbang
*Assistant Examiner*—Tai Nguyen
(74) *Attorney, Agent, or Firm*—Fitzpatrick, Cella, Harper & Scinto

(57) ABSTRACT

The present invention provides a method for manufacturing an ink jet recording head utilizing ink bubbling by heating of an exothermic resistor to thereby eject ink and a method manufacturing the same, including the steps of: preparing a substrate provided with the exothermic resistor; applying such first resin on the substrate as to provide a first mold shape for forming the nozzle channel and the movable member; forming the first mold shape using the first resin; applying, on the substrate, second resin over the first mold shape for forming the nozzle channel and the movable member; and removing the first mold shape. By this method, the movable member is formed in the nozzle channel between the ink inlet and the exothermic resistor to thereby provide a high-density, high-accuracy ink jet recording head which can improve a frequency response while maintaining proper discharge performance.

4 Claims, 19 Drawing Sheets

U.S. PATENT DOCUMENTS 5,478,606 A * 12/1995 Ohkuma et al. ............ 427/555
5,758,417 A * 6/1998 Kobayashi et al. ........ 29/890.1
5,872,582 A 2/1999 Pan
5,943,074 A 8/1999 Kashino et al.
6,095,640 A 8/2000 Ishinaga et al.
6,109,734 A * 8/2000 Kashino et al. ............... 347/65
6,113,224 A 9/2000 Sugama et al.
6,164,763 A 12/2000 Sugama et al.
6,180,018 B1 1/2001 Miyagawa et al.
6,196,667 B1 3/2001 Hiroki et al.
6,199,972 B1 3/2001 Ishinaga et al.
6,206,505 B1 3/2001 Yoshihira et al.
6,286,940 B1 9/2001 Sugiyama et al.
6,374,482 B1 4/2002 Mihara et al.
6,378,992 B2 4/2002 Kudo et al.
6,378,993 B1 4/2002 Ozaki et al.
6,386,686 B1 5/2002 Kubota et al.
6,386,832 B1 5/2002 Taneya et al.
6,390,604 B2 5/2002 Kashino et al.
6,402,302 B1 6/2002 Ozaki et al.
6,409,296 B1 6/2002 Misumi et al.
6,409,317 B1 6/2002 Shimazu et al.
6,435,661 B1 8/2002 Inoue et al.
6,435,670 B1 8/2002 Inoue et al.
6,439,700 B1 8/2002 Ishinaga et al.
6,450,776 B1 9/2002 Taneya et al.
6,455,112 B1 9/2002 Ohkuma et al.
6,457,816 B1 10/2002 Ishinaga et al.
6,464,342 B1 10/2002 Kubota et al.
6,464,345 B2 10/2002 Kubota et al.
6,485,132 B1 11/2002 Hiroki et al.
6,491,380 B2 12/2002 Taneya et al.
6,491,382 B2 12/2002 Taneya et al.
6,497,475 B1 12/2002 Kubota et al.
6,513,914 B2 2/2003 Misumi et al.
6,533,400 B1 3/2003 Kudo et al.
6,540,336 B2 4/2003 Kubota et al.
6,591,500 B1 7/2003 Suzuki et al.
2002/0021337 A1 2/2002 Sugiyama et al.
2002/0030722 A1 3/2002 Ishinaga et al.
2002/0085048 A1 7/2002 Ishinaga et al.
2003/0011655 A1 1/2003 Miyagawa et al.
2003/0030701 A1 2/2003 Sugiyama et al.
2003/0038852 A1 2/2003 Kubota et al.

* cited by examiner

METHOD FOR MANUFACTURING AN INK JET RECORDING HEAD

This is a divisional application of application Ser. No. 10/214,105, filed on Aug. 8, 2002 now U.S. Pat. No. 6,663,229.

BACKGROUND OF THE INVENTION

1. Field of the Invention

The present invention relates to an ink jet recording head for discharging a liquid from an orifice to form a droplet and a method for manufacturing the same.

2. Related Background Art

As for this type of an ink jet recording head for discharging a liquid from an orifice to form a droplet, an ink jet recording method disclosed in, for example, Japanese Patent Application Laid-Open No. 54-51837 has a different feature from the others in exerting thermal energy on the liquid to thereby obtain motive power for discharging the droplet.

That is, the recording method disclosed in this publication features that a liquid is heated when it receives an action of thermal energy to thereby produce a bubble, which in turn causes a droplet to be discharged from an orifice at the tip of a recording head section, which droplet then sticks to a recording medium to record information.

A recording head applied to this recording method typically comprises a liquid discharge section which includes as components an orifice from which a liquid is discharged and a thermal acting portion section which has a liquid channel to communicate with the orifice and at which thermal energy acts on the liquid to discharge a droplet, an exothermic resistor layer serving as a thermal converter, which is means for generating thermal energy, an overlying protection layer for protecting this exothermic resistor layer from ink, and an underlying layer for accumulating heat.

To improve a printing speed of such an ink jet recording head that obtains motive power for liquid discharge by exerting thermal energy on a liquid, its frequency response may be improved to solve the problem in performance. To improve the frequency response, it is necessary to improve ink refilling performance after droplet discharge. To improve the ink refilling performance, it is in turn necessary to reduce flow resistance over a passage from an ink inlet to an ink orifice.

If the flow resistance is reduced, however, a bubbling pressure escapes toward the ink inlet to result in a drop in discharge speed and so worsen stability, thus deteriorating the discharge performance hence printing. Accordingly, it has been difficult to improve the frequency response while maintaining the discharge performance at a proper level.

Furthermore, to meet a recent market desire for a higher image quality and so to achieve high-resolution printing by use of a small droplet, an ink jet print head needs to be arrayed to provide a high density and also to fly a minute droplet from an orifice.

On the other hand, there has been made such a proposal for providing a movable member, which provides a so-called fluid diode, somewhere in a nozzle channel between the ink inlet and the orifice to thereby improve the frequency response while maintaining proper discharge performance. Such a conventional ink jet recording head, however, may sometimes be subject to flake-off or destruction of the movable member.

SUMMARY OF THE INVENTION

In view of the above, it is an object of the present invention to provide a high-density, high-accuracy, and highly reliable ink jet recording head which solves the above-mentioned problems to thereby enable forming a movable member in the nozzle channel between the ink inlet and the orifice, thus improving the frequency response while keeping proper discharge performance.

To this end, a method of the present invention for manufacturing an ink jet recording head having, on a substrate provided with an exothermic resistor, an ink orifice provided in correspondence to said exothermic resistor and a nozzle channel communicating with said ink orifice, with a movable member formed in said nozzle channel somewhere between said exothermic resistor and an ink inlet for supplying ink into said nozzle channel in such a configuration that a bubble generated in the ink in the nozzle channel by heat generated by said exothermic resistor is utilized to discharge the ink from said ink orifice, comprising the step of:

preparing the substrate provided with said exothermic resistor;

applying such first resin on said substrate as to provide a first mold shape for forming said nozzle channel and said movable member;

forming said first mold shape using said first resin;

applying on said substrate second resin over said first mold shape for forming said nozzle channel and said movable member; and removing said first mold shape.

By this manufacturing method, the movable member can be molded at the same time as the nozzle mold shape and so can be formed together with the nozzle channel by photolithography at a high density and high accuracy, thus manufacturing a high density, high accuracy ink jet recording head.

Furthermore, to form the movable member, a mask pattern having a width less than a resolution limit of said first resin can be used to form such a portion of said first mold shape as to be used to form said movable member and use the resin applied on the portion later, thus forming the mold shapes of the nozzle channel and the movable member forming portion using the same mask. Accordingly, the nozzle channel and the movable member can be formed at a mask formation accuracy. Furthermore, it is possible to eliminate one patterning step, thus reducing the costs.

Another ink jet recording head of the present invention for utilizing a bubble generated in ink in a nozzle channel when the ink is heated by an exothermic resistor, to discharge the ink from an ink orifice, comprising:

a substrate provided with said exothermic resistor; and said nozzle channel formed on said substrate, with a movable member formed in said nozzle channel somewhere between said exothermic resistor and an ink inlet for supplying the ink into said nozzle orifice, said movable member having a supporting point thereof on such a wall of said nozzle channel as to be opposed to said substrate and a free end thereof on a surface of said nozzle channel on the side of said substrate and being formed integrally with said wall opposed to said substrate.

In this ink jet recording head, the same material can be used to form the ink channel and the movable member and integrally, so that it is possible to make this ink jet recording head highly reliable and this movable member difficult to flake off or destroy.

DESCRIPTION OF THE PREFERRED EMBODIMENTS

Figure 22:
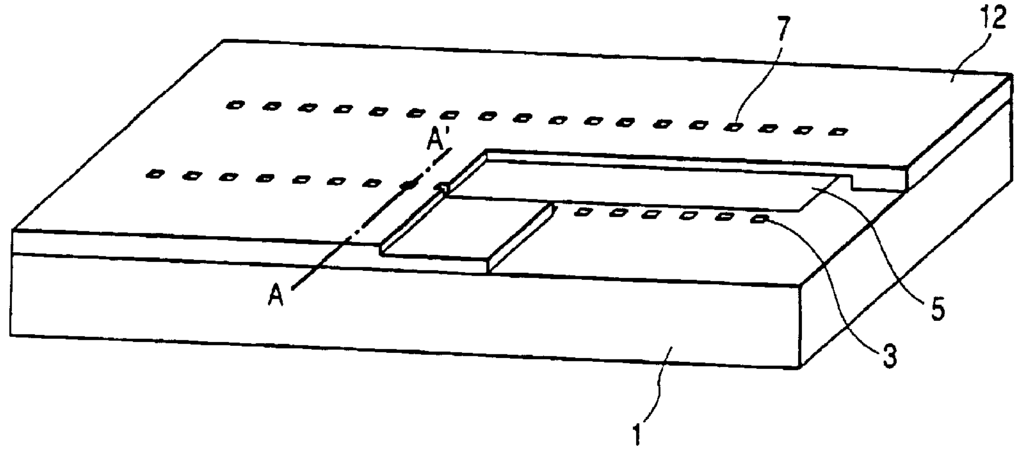
FIG. 22 is a schematic perspective view for showing the ink jet recording head of the present invention.

The following will describe embodiments of the present invention. FIG. 22 shows a schematic perspective view of an ink jet recording head of the present invention. On a substrate 1 provided with an exothermic resistor 3 and an ink inlet 5 are formed a member 12 which makes up an ink channel and an orifice 7. Note here that in the following the cross-sectional views, illustrating methods for manufacturing ink jet recording heads in embodiments, of FIGS. 1A to 5B (first embodiment), FIGS. 6A to 9B (second embodiment), FIGS. 12A to 14C (third embodiment), and FIGS. 15A to 17C (fourth embodiment) correspond to the cross-sectional view taken along line A–A' of FIG. 22.

First Embodiment

The following will describe a method for manufacturing the ink jet recording head according to the first embodiment of the present invention with reference to FIGS. 1A to 5B.

Figure 1A:
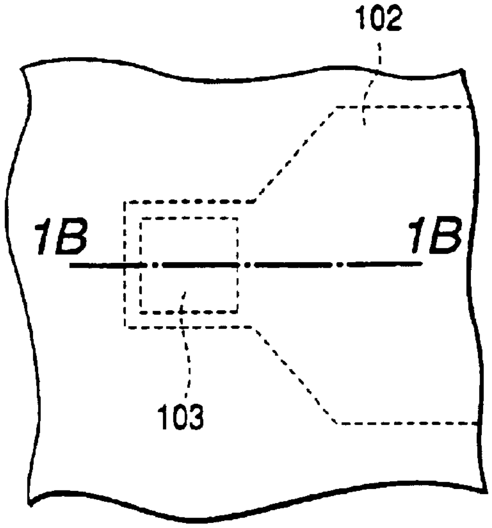
FIG. 1A is a schematic cross-sectional view for showing a method for manufacturing an ink jet recording head according to a first embodiment of the present invention.
Figure 1B:
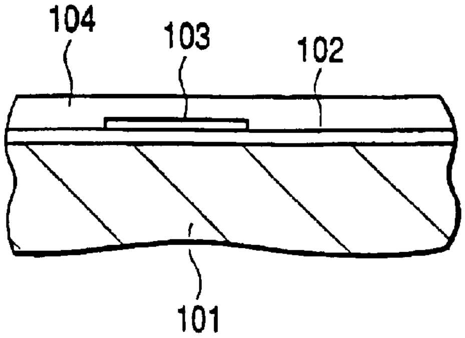
FIG. 1B is a cross-sectional view taken along line 1B—1B of FIG. 1A.

First, on a silicon substrate 101 are formed a heat accumulation layer 102 and 25-μm×25-μm heaters (exothermic resistors) 103 at 600 dpi, on which is formed a protection layer 104 (FIGS. 1A and 1B).

Figure 1C:
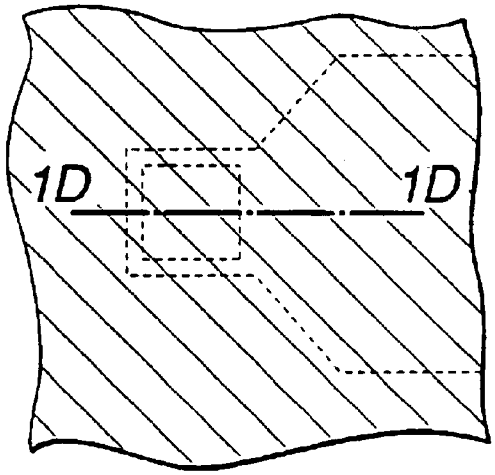
FIG. 1C is a schematic cross-sectional view for explaining a step which follows the step of FIG. 1A of the method for manufacturing the ink jet recording head according to the first embodiment of the present invention.
Figure 1D:
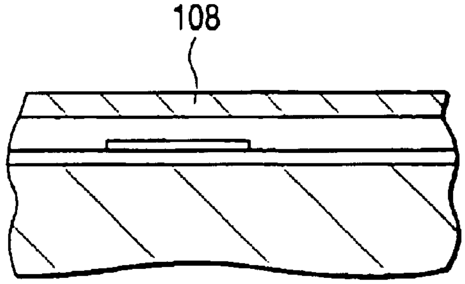
FIG. 1D is a cross-sectional view taken along line 1D—1D of FIG. 1C.

Next, a first mold resist 108 is applied to a thickness of 3 μm (FIGS. 1C and 1D).

Figure 2A:
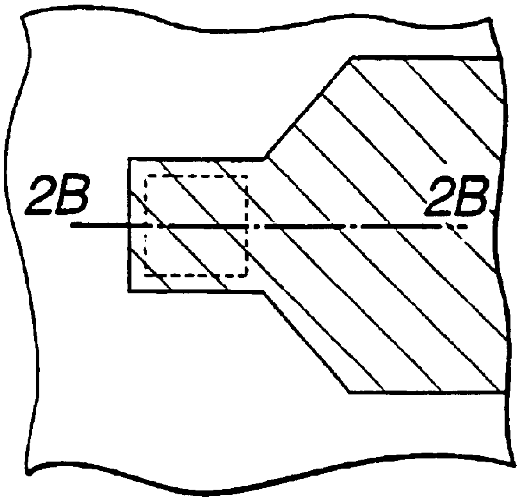
FIG. 2A is a schematic cross-sectional view for explaining a step which follows the step of FIG. 1C of the method for manufacturing the ink jet recording head according to the first embodiment of the present invention.
Figure 2B:
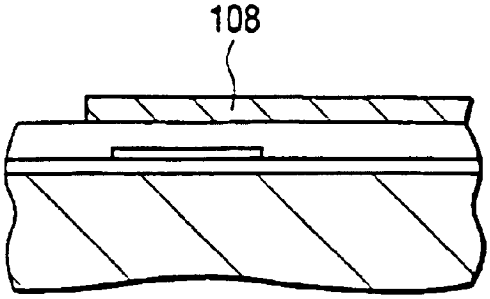
FIG. 2B is a cross-sectional view taken along line 2B—2B of FIG. 2A.

Next, the first mold resist 108 is patterned into a shape of the nozzle channel by exposure and development (FIGS. 2A and 2B).

Figure 2C:
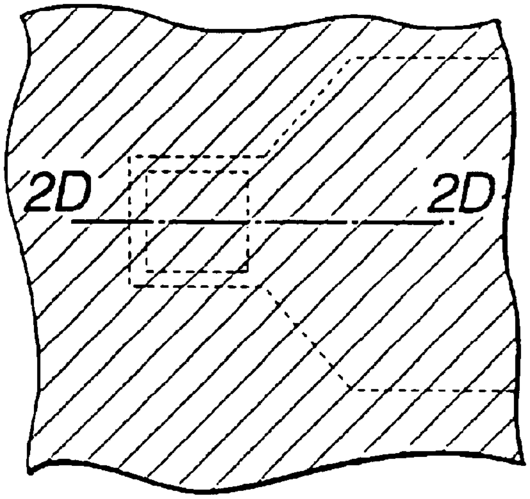
FIG. 2C is a schematic cross-sectional view for explaining a step which follows the step of FIG. 2A of the method for manufacturing the ink jet recording head according to the first embodiment of the present invention.
Figure 2D:
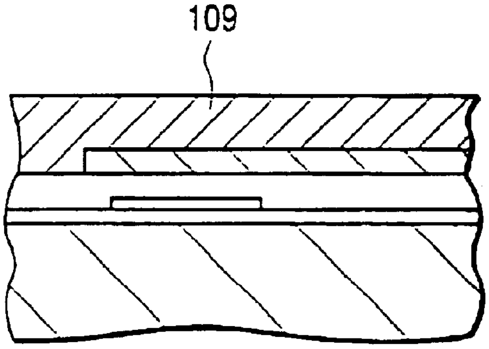
FIG. 2D is a cross-sectional view taken along line 2D—2D of FIG. 2C.

Next, on thus formed pattern is applied a second mold resist 109 to a thickness of 12 μm (FIGS. 2C and 2D).

Figure 3A:
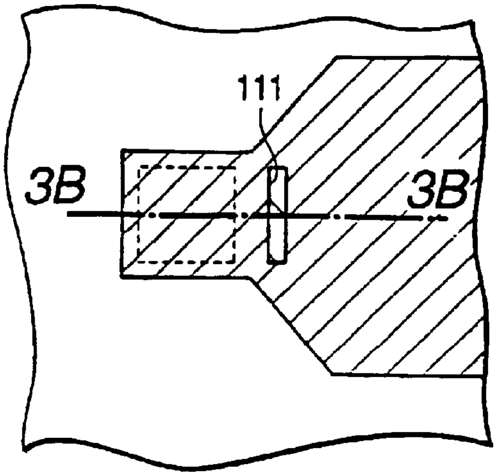
FIG. 3A is a schematic cross-sectional view for explaining a step which follows the step of FIG. 2C of the method for manufacturing the ink jet recording head according to the first embodiment of the present invention.
Figure 3B:
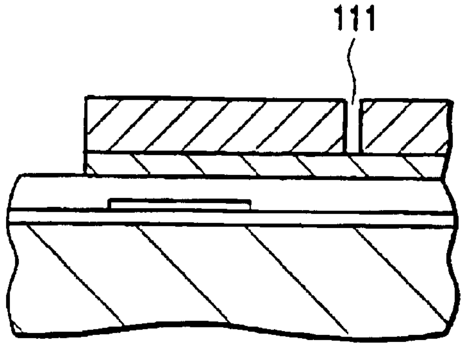
FIG. 3B is a cross-sectional view taken along line 3B—3B of FIG. 3A.

Next, the second mold resist 109 is patterned into the nozzle channel shape and a movable member shape 111 (5 μm×25 μm) by exposure and development (FIGS. 3A and 3B).

Figure 3C:
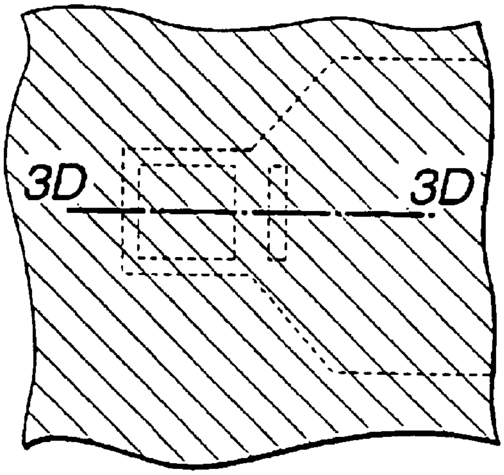
FIG. 3C is a schematic cross-sectional view for explaining a step which follows the step of FIG. 3A of the method for manufacturing the ink jet recording head according to the first embodiment of the present invention.
Figure 3D:
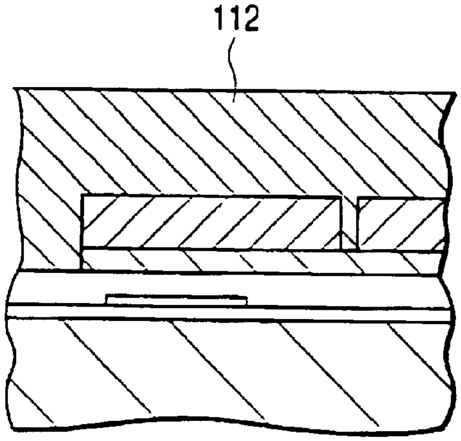
FIG. 3D is a cross-sectional view taken along line 3D—3D of FIG. 3C.

Next, a photosensitive epoxy material 112 is applied to form the nozzle channel, the orifice, and the movable member (FIGS. 3C and 3D).

Figure 4A:
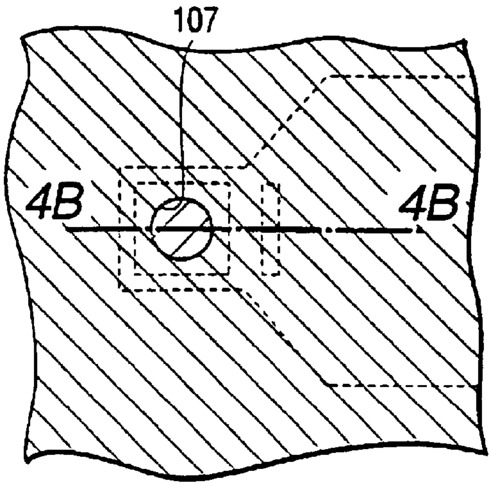
FIG. 4A is a schematic cross-sectional view for explaining a step which follows the step of FIG. 3C of the method for manufacturing the ink jet recording head according to the first embodiment of the present invention.
Figure 4B:
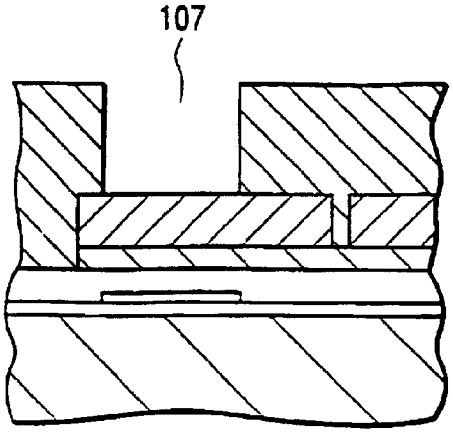
FIG. 4B is a cross-sectional view taken along line 4B—4B of FIG. 4A.

Next, an orifice 107 is patterned to have a diameter of 18 μm by exposure and development (FIGS. 4A and 4B).

Figure 4C:
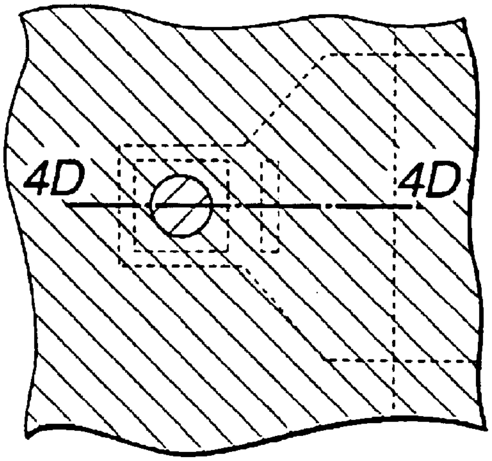
FIG. 4C is a schematic cross-sectional view for explaining a step which follows the step of FIG. 4A of the method for manufacturing the ink jet recording head according to the first embodiment of the present invention.
Figure 4D:
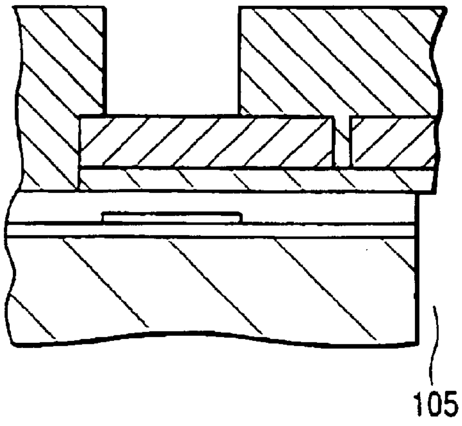
FIG. 4D is a cross-sectional view taken along line 4D—4D of FIG. 4C.

Next, an ink inlet 105 is formed by performing dry-etching on the substrate on its back face side (FIGS. 4C and 4D).

Figure 5A:
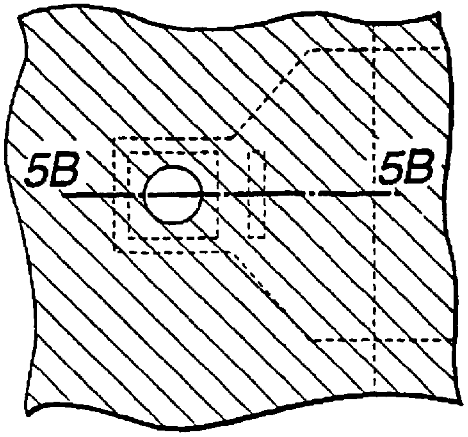
FIG. 5A is a schematic cross-sectional view for explaining a step which follows the step of FIG. 4C of the method for manufacturing the ink jet recording head according to the first embodiment of the present invention.
Figure 5B:
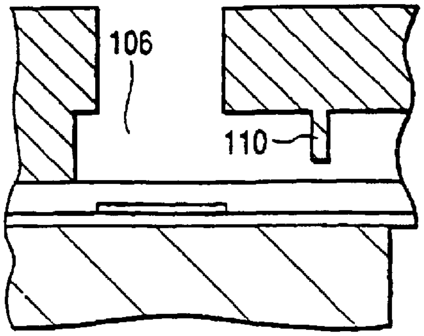
FIG. 5B is a cross-sectional view taken along line 5B—5B of FIG. 5A.

Finally, the resists which have served as mold shapes are etched off using an etchant to complete a head chip having the nozzle 106 with the movable member 110 formed therein (FIGS. 5A and 5B). Thus, the movable member formed in the nozzle channel has its supporting point on such a wall of the nozzle channel as to be opposite to a surface of the substrate on which the exothermic resistor is mounted and its free end on this side of the substrate.

Then, electrical mounting is carried out for feeding power to electrify the heater and tube in order to supply ink, thus completing the ink jet recording head.

Thus completed head has a high frequency response and good discharge performance. It is thus possible to print information speedily and satisfactorily.

Furthermore, since the movable member is patterned by photolithography, it can be formed highly accurately and also arranged with respect to the heater, the nozzle, and the orifice at a high accuracy. Accordingly, it is possible to sufficiently meet the requirements for the future smaller droplet and higher density.

Furthermore, the head can be manufactured integrally with the epoxy material of the nozzle and the orifice and so is not so subject to flake-off or destruction in long-term services nor to solving out or swelling of the epoxy material if it is selected to have ink resisting properties.

It is thus possible to provide a highly reliable head.

Second Embodiment

The following will describe another method for manufacturing an ink jet recording head according to the second embodiment of the present invention with reference to FIGS. 6A to 9B.

Figure 6A:
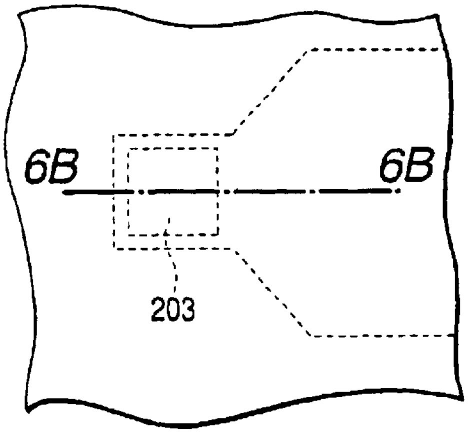
FIG. 6A is a schematic cross-sectional view for showing a method for manufacturing an ink jet recording head according to a second embodiment of the present invention.
Figure 6B:
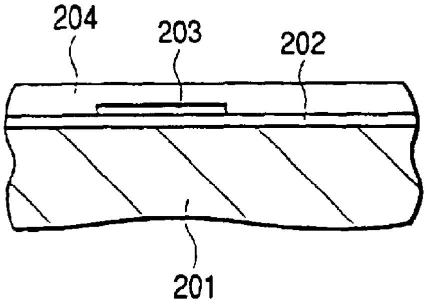
FIG. 6B is a cross-sectional view taken along line 6B—6B of FIG. 6A.

First, as in the case of the first embodiment, a substrate provided with heaters on which 25-μm by 25-μm heaters are arrayed is made (FIGS. 6A and 6B).

Figure 6C:
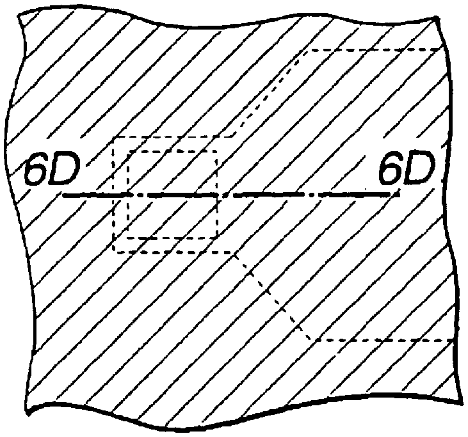
FIG. 6C is a schematic cross-sectional view for explaining a step which follows the step of FIG. 6A of the method for manufacturing the ink jet recording head according to the second embodiment of the present invention.
Figure 6D:
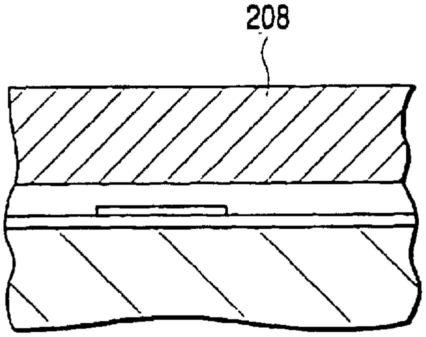
FIG. 6D is a cross-sectional view taken along line 6D—6D of FIG. 6C.

Next, a photo-resist 208 which provides a mold shape is applied to a thickness of 20 μm (FIGS. 6C and 6D).

Figure 7A:
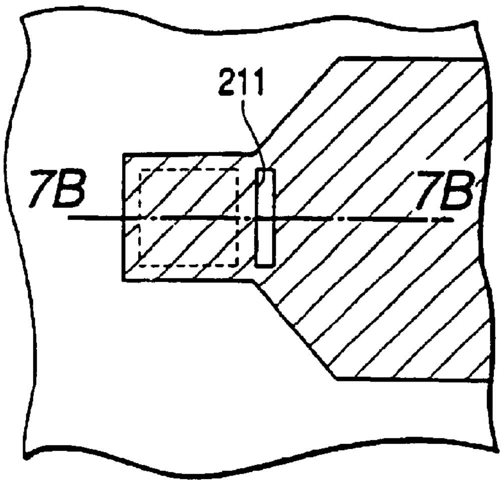
FIG. 7A is a schematic cross-sectional view for explaining a step which follows the step of FIG. 6C of the method for manufacturing the ink jet recording head according to the second embodiment of the present invention.
Figure 7B:
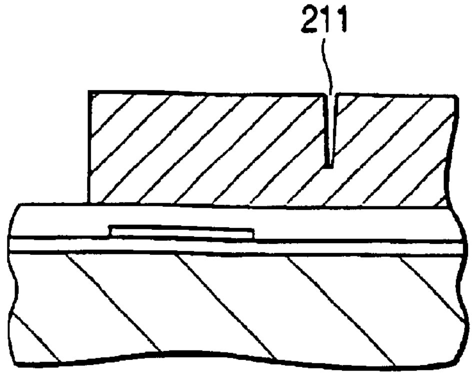
FIG. 7B is a cross-sectional view taken along line 7B—7B of FIG. 7A.
Figure 10:
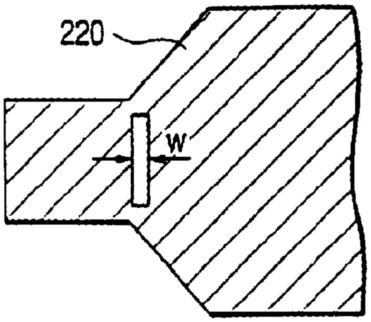
FIG. 10 is a plan view for showing a mask pattern used in the step of FIG. 7A in the second embodiment of the present invention.

Next, a pattern is formed through exposure and development by using a mask which has a mask pattern of a nozzle channel shape and a movable member shape such as shown in FIG. 10 (FIGS. 7A and 7B).

The photo-resist 208 used in the present embodiment has a resolution of 4 μm when it is applied to a thickness of 20 μm, so that the mask used in this patterning is selected so that its width W at a portion that corresponds to a thickness of a movable member in the mask pattern may be 2 μm less than the resolution limit.

Such a mask as to have the width less than the resolution limit is used in formation to result in the resist being patterned halfway as shown in FIGS. 7A and 7B. The pattern, therefore, does not reach the substrate and so can function as a mold shape of the movable member.

Figure 7C:
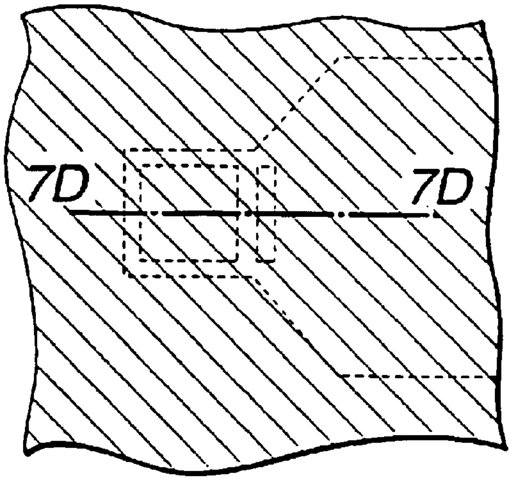
FIG. 7C is a schematic cross-sectional view for explaining a step which follows the step of FIG. 7A of the method for manufacturing the ink jet recording head according to the second embodiment of the present invention.
Figure 7D:
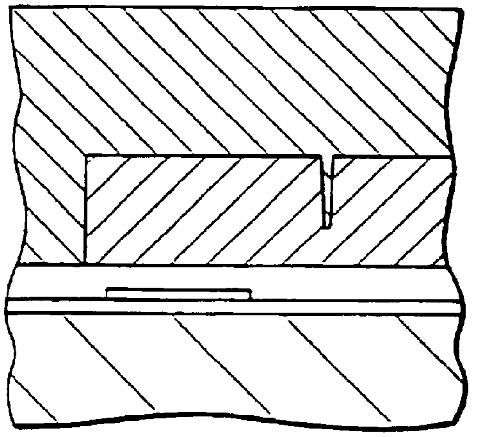
FIG. 7D is a cross-sectional view taken along line 7D—7D of FIG. 7C.

Next, a photo-sensitive epoxy is applied to form a nozzle channel, an orifice, and the movable member (FIGS. 7C and 7D).

Figure 8A:
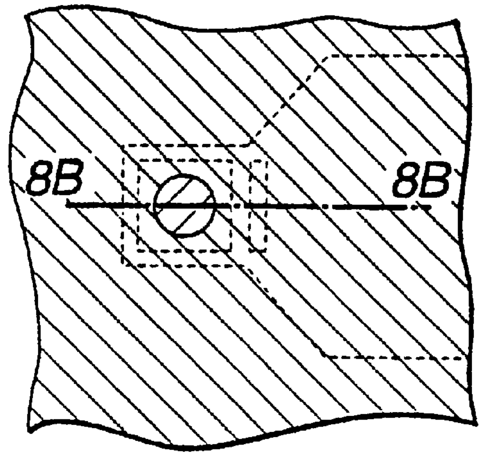
FIG. 8A is a schematic cross-sectional view for explaining a step which follows the step of FIG. 7C of the method for manufacturing the ink jet recording head according to the second embodiment of the present invention.
Figure 8B:
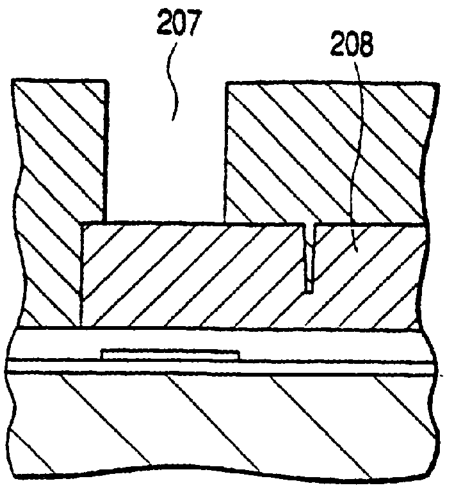
FIG. 8B is a cross-sectional view taken along line 8B—8B of FIG. 8A.

Next, the orifice is patterned to have a diameter of 18 μm by exposure and development (FIGS. 8A and 8B).

Figure 8C:
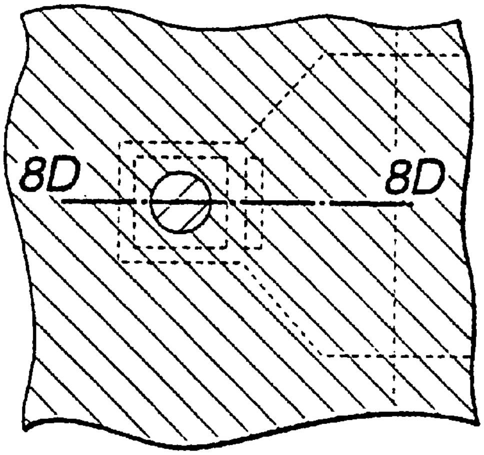
FIG. 8C is a schematic cross-sectional view for explaining a step which follows the step of FIG. 8A of the method for manufacturing the ink jet recording head according to the second embodiment of the present invention.
Figure 8D:
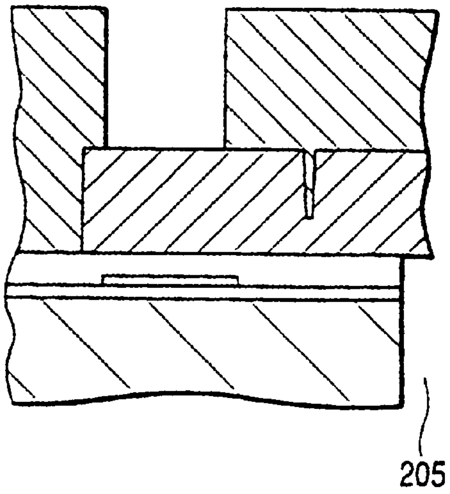
FIG. 8D is a cross-sectional view taken along line 8D—8D of FIG. 8C.

Next, dry-etching is conducted on the substrate on its back face side to form an ink inlet (FIGS. 8C and 8D).

Figure 9A:
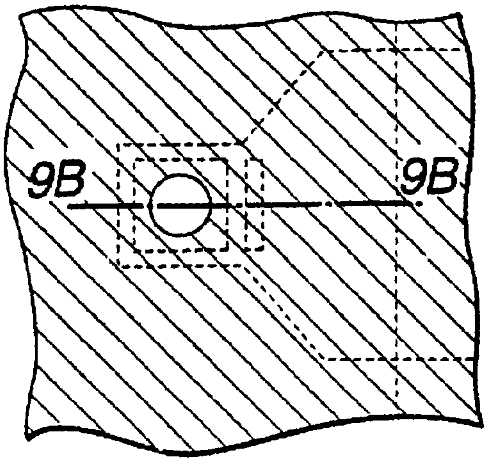
FIG. 9A is a schematic cross-sectional view for explaining a step which follows the step of FIG. 8C of the method for manufacturing the ink jet recording head according to the second embodiment of the present invention and FIG. 9B is a cross-sectional view taken along line 9B—9B of FIG. 9A.
Figure 9B:
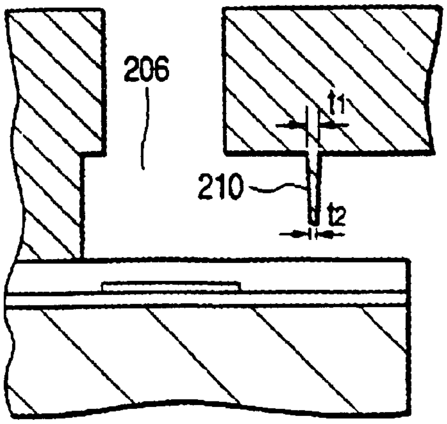

Finally, the resist which has served as the mold shape is etched off using an etchant to complete the substrate provided with a nozzle (FIGS. 9A and 9B).

Then, a tube (not shown) for supplying ink and a printed wiring board (not shown) for feeding power to electrify the heaters are connected to the substrate, thus completing the ink jet recording head.

Thus completed head has a high frequency response and good discharge performance. It is thus possible to print information speedily and satisfactorily.

In addition to the effects of the first embodiments, the present embodiment can eliminate one of the application, exposure, and development steps for the mold resist, thus reducing the costs for manufacturing.

Furthermore, the nozzle channel and the movable member can be formed using the same mask, further improving accuracy in alignment.

Furthermore, the movable member thus formed in the nozzle channel is formed integrally with the wall of the nozzle channel as in the case of the first embodiment and also has such a construction that its supporting-point side thickness $t_1$ is larger than its free-end side thickness $t_2$, thus making itself less subject to flake-off or destruction. It is thus possible to provide more highly reliable ink jet recording head.

Figure 11:
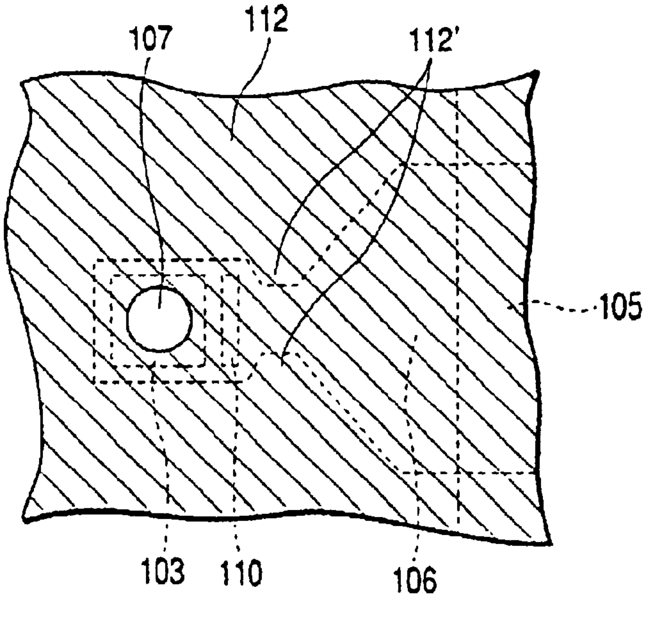
FIG. 11 is a plan view for showing an ink jet recording head according to a variant of the second embodiment of the present invention.

Furthermore, as shown in FIG. 11, if the nozzle is patterned to form its channel in such a manner that part of the nozzle channel between the movable member and the inlet may be narrowed than the width of the movable member to thereby restrict the movable member from being displaced toward the inlet, the bubbling pressure can be suppressed more from escaping toward the inlet, thus manufacturing the head with even higher discharge performance without increasing the required steps in manufacture.

Third Embodiment

The following will describe a further method for manufacturing an ink jet recording head (ink jet print head) according to the third embodiment of the present invention with reference to FIGS. 12A to 14C.

Figure 12A:
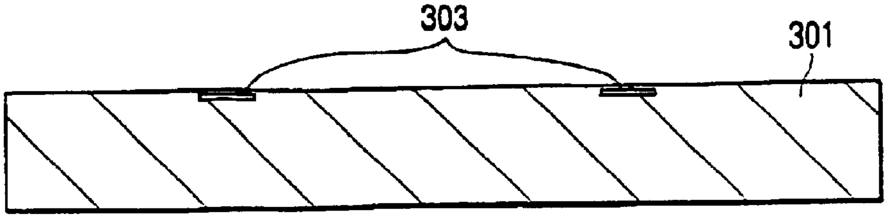
FIG. 12A is a schematic cross-sectional view for showing a method for manufacturing an ink jet recording head according to a third embodiment of the present invention.
Figure 12B:
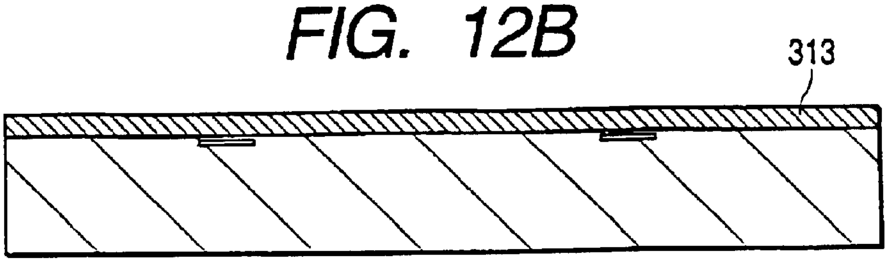
FIG. 12B is a schematic cross-sectional view for explaining a step which follows the step of FIG. 12A of the method for manufacturing the ink jet recording head according to the third embodiment of the present invention.

First, as shown in FIG. 12A, for example, a silicon chip is mounted thereon by patterning etc. with a plurality of heaters 303 and a predetermined wiring (not shown) for feeding a voltage to these heaters 303, thus forming an element substrate 301. Then, as shown in FIG. 12B, on said element substrate 301 is applied to a thickness of about 5.0 μm a transparent negative-type resin layer 313 having the same composition as an orifice substrate 312 in order to form a projecting barrier 313' which restricts said movable member 310 from being displaced toward an inlet 305.

Figure 12C:
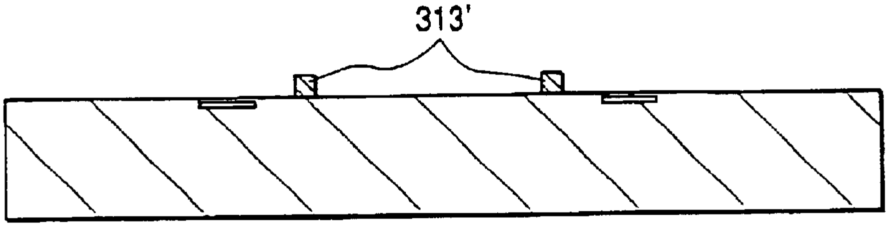
FIG. 12C is a schematic cross-sectional view for explaining a step which follows the step of FIG. 12B of the method for manufacturing the ink jet recording head according to the third embodiment of the present invention.
Figure 12D:
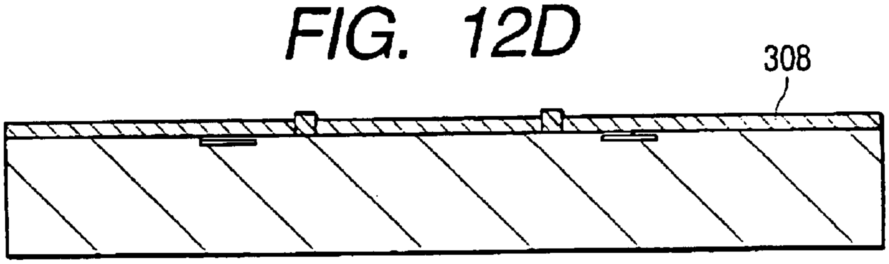
FIG. 12D is a schematic cross-sectional view for explaining a step which follows the step of FIG. 12C of the method for manufacturing the ink jet recording head according to the third embodiment of the present invention.
Figure 12E:
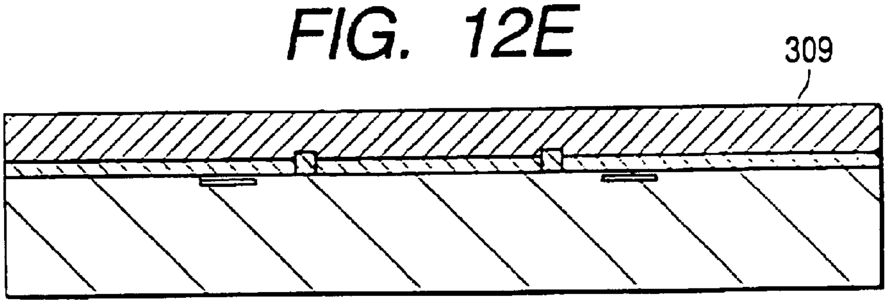
FIG. 12E is a schematic cross-sectional view for explaining a step which follows the step of FIG. 12D of the method for manufacturing the ink jet recording head according to the third embodiment of the present invention.

Then, as shown in FIG. 12C, UV rays are used to form the projecting pattern (projecting barrier) 313'. Next, as shown in FIGS. 12D and 12E, on said substrate 301 are applied an underlying resin layer 308 and an overlying resin layer 309 by spin coating consecutively. These underlying and overlying resin layers 308 and 309 are made of resin that can be resolved because its intra-molecular bond is destroyed when it is irradiated with Deep-UV rays (hereinafter called DUV rays), which are ultra-violet rays having a wavelength of 330 nm or less. Furthermore, by using resin which exhibits cross-linking properties due to dehydration/condensation as the material of the underlying resin layer, interactive melting of the underlying and overlying resin layers 308 and 309 can be prevented when the overlying resin layer 309 is applied by spin coating. As the material of the underlying resin layer 308, a solution has been used which is obtained, for example, by resolving, in a cyclohexanone solvent, binary copolymer (P(MMA-MAA)=90:10) polymerized by polymerizing radicals of methacrylic acid methyl (MMA) and methacrylic acid (MAA). As the material of the overlying resin layer 309, on the other hand, a solution has been used which is obtained, for example, by resolving poly-methyl isopropenyl ketone (PMIPK) in a cyclohexanone solvent. The binary copolymer (P(MMA-MAA)) used as the material of the underlying resin layer can be heated at a temperature of 180–200° C. for 30 minutes to two hours to provide a harder cross-linking film owing to the dehydration/condensation reaction. Note here that although this cross-linking film is insoluble in a solvent, when irradiated with an electron beam such as DUV rays it decomposes and its mole molecular weight is decreased, so that only a portion thereof irradiated by the electron beam becomes soluble in the solvent.

Figure 13A:
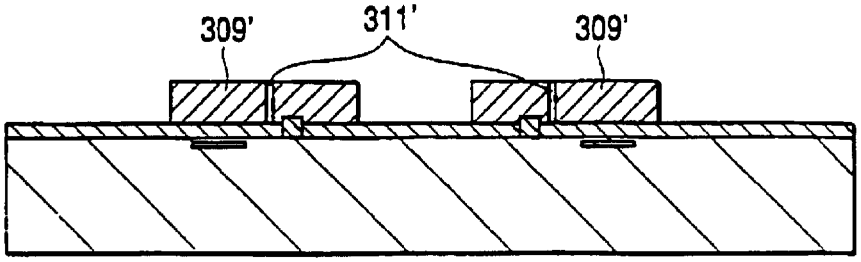
FIG. 13A is a schematic cross-sectional view for explaining a step which follows the step of FIG. 12E of the method for manufacturing the ink jet recording head according to the third embodiment of the present invention.

Then, as shown in FIG. 13A, a filter which blocks DUV rays having a wavelength of less than 260 nm is mounted to an exposing apparatus for applying DUV rays to then use wavelength selecting means which transmits only such rays as to have a wavelength of 260 nm or more to thereby apply Near-UV rays (hereinafter called NUV rays) having a wavelength nearly equal to 260 to 330 nm to the overlying resin layer 309 in order to expose and develop it, thus forming a desired nozzle pattern 309' by use of the overlying resin layer 309. Since the ratio in photosensitivity to NUV rays with a wavelength of about 260 to 330 nm is about 40:1 between the overlying and underlying resin layers 309 and 308, the underlying resin layer 308 is not exposed to the rays, so that the overlying resin layer: P(MMA-MAA) is not decomposed. Furthermore, the underlying resin layer 308 is made of a thermal cross-linkage film and so not resolved in a developer in the development of the overlying resin layer.

Figure 13B:
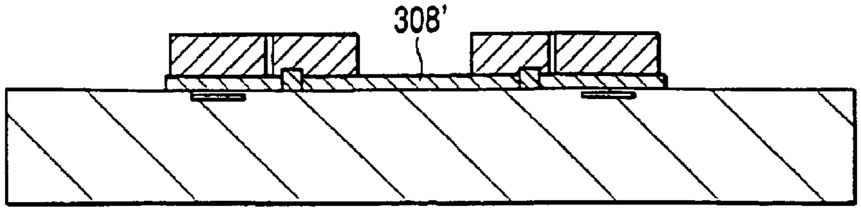
FIG. 13B is a schematic cross-sectional view for explaining a step which follows the step of FIG. 13A of the method for manufacturing the ink jet recording head according to the third embodiment of the present invention.
Figure 13C:
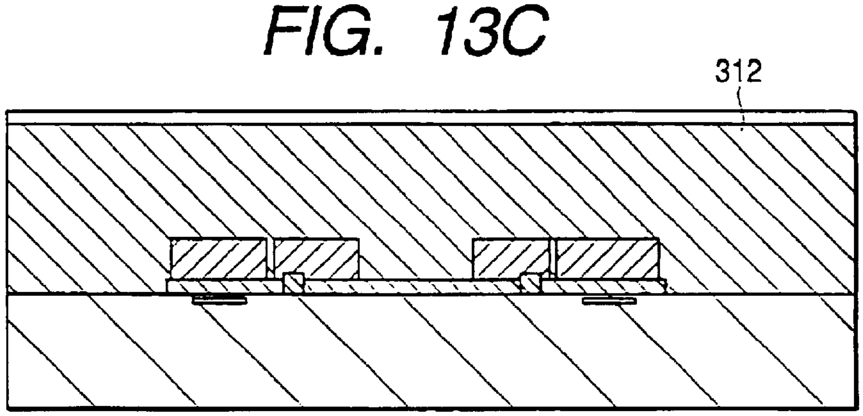
FIG. 13C is a schematic cross-sectional view for explaining a step which follows the step of FIG. 13B of the method for manufacturing the ink jet recording head according to the third embodiment of the present invention.

Then, as shown in FIG. 13B, the above-mentioned exposing apparatus is used to apply DUV rays with a wavelength of 210 to 330 nm to expose and develop the underlying resin layer, thus forming a desired nozzle pattern 308' by use of the underlying resin layer 308. The P(MMA-MAA) material used to form the underlying resin layer 308 has a high resolution and so can be formed so as to have a trench construction with a side wall inclination angle of 0 to 5° even if it is formed to a thickness of 5 to 20 μm or so.

Then, on the overlying and underlying resin layers 309 and 308 which have thus been made resolvable because the intra-molecular cross-linkage bond is destroyed by DUV rays with the nozzle patterns 308' and 309' formed thereon, a transparent covering resin layer 312 is applied which provides the orifice substrate 12 as shown in FIG. 12C.

Figure 13D:
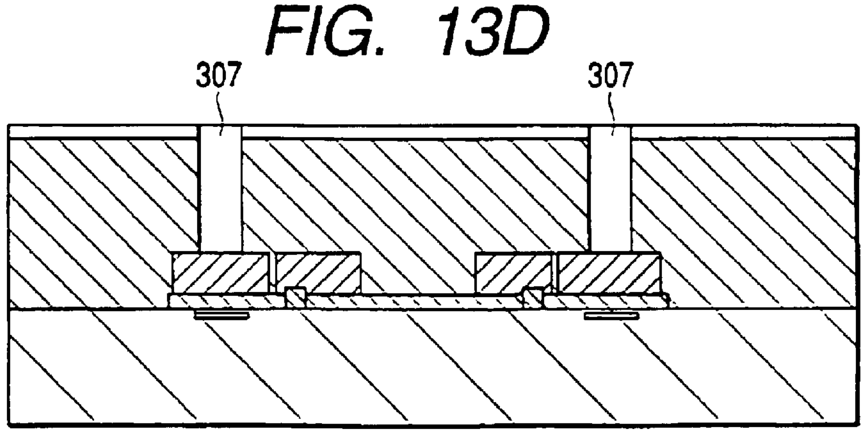
FIG. 13D is a schematic cross-sectional view for explaining a step which follows the step of FIG. 13C of the method for manufacturing the ink jet recording head according to the third embodiment of the present invention.

Then, as shown in FIG. 13D, the exposing apparatus is used to apply UV rays to the covering resin layer 312 to expose and develop a portion that corresponds to an orifice 307 in order to etch it off, thus forming the orifice substrate. Preferably an inclination angle of a side wall of the orifice formed in this orifice substrate is nearly 020 with respect to the plane perpendicular to the main surface of said element substrate. Furthermore, as far as the inclination angle is 0 to 10°, the droplet discharge properties are not so affected adversely.

Figure 14A:
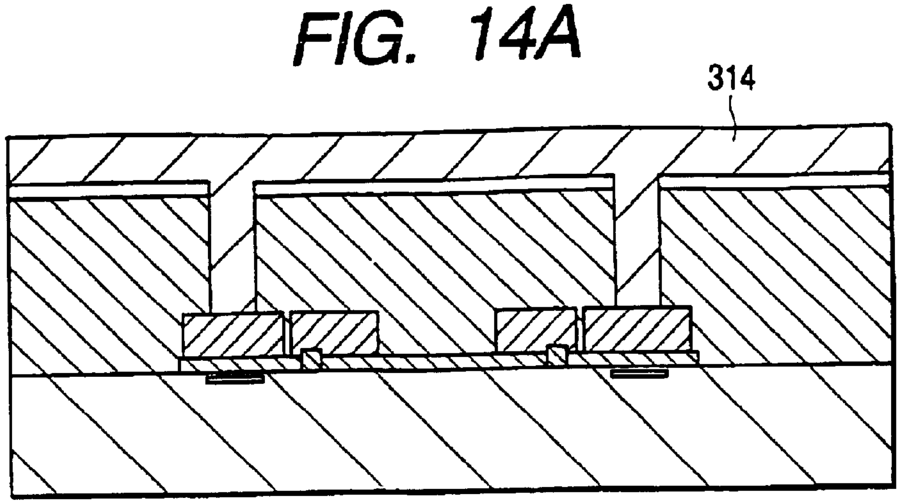
FIG. 14A is a schematic cross-sectional view for explaining a step which follows the step of FIG. 13D of the method for manufacturing the ink jet recording head according to the third embodiment of the present invention.
Figure 14B:
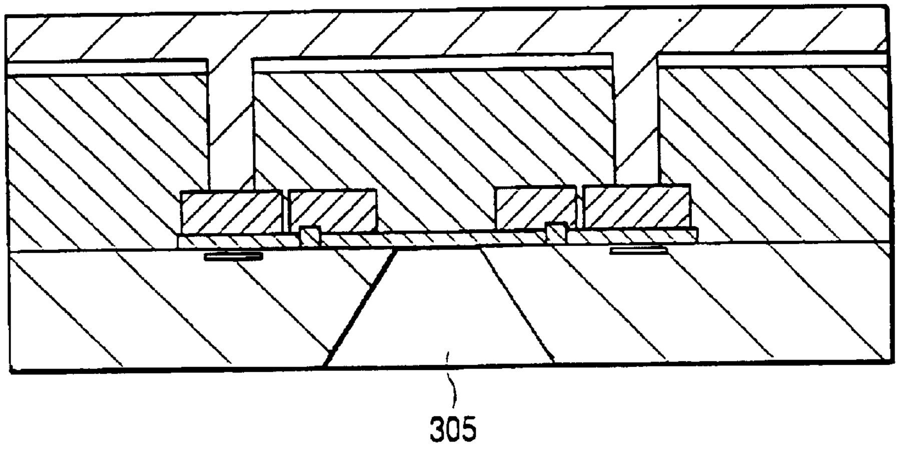
FIG. 14B is a schematic cross-sectional view for explaining a step which follows the step of FIG. 14A of the method for manufacturing the ink jet recording head according to the third embodiment of the present invention.

Then, as shown in FIG. 14A, to protect the right side of the orifice plate in chemical etching, an organic resin film 314 is applied thereon. Then, as shown in FIG. 14B, chemical etching is conducted on the back side of the element substrate 301 to thereby form the inlet 305 therein. This chemical etching is of anisotropic processing by use of, for example, a strong alkali solution (KOH, NaOH, TMAH).

Figure 14C:
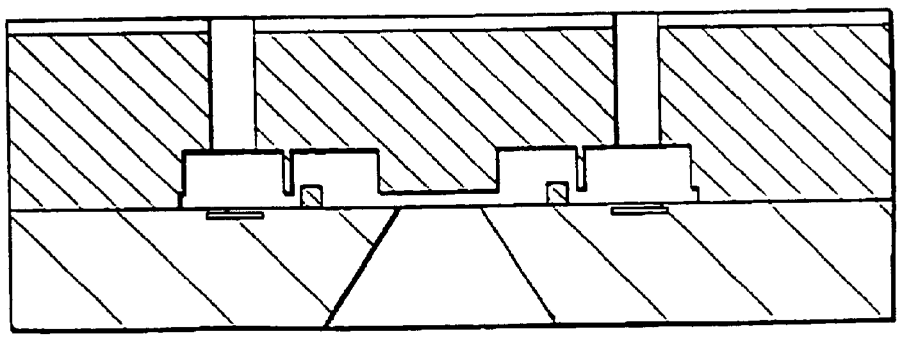
FIG. 14C is a schematic cross-sectional view for explaining a step which follows the step of FIG. 14B of the method for manufacturing the ink jet recording head. according to the third embodiment of the present invention.

Then, as shown in FIG. 14C, DUV rays with a wavelength of 300 nm or less are applied from the main surface side of the element substrate 301 through the covering resin layer 312 to thereby solve out the overlying and underlying resin layers 309 and 308, which are the nozzle mold shape positioned between the element substrate 301 and the orifice substrate 312.

The movable member 310, therefore, is formed between the orifice 307 and the inlet 305 and also between the heaters 303 and the inlet 305 in the supplying passage (nozzle channel) communicating the orifice 307 and the inlet 305 with each other, thus giving a chip provided with a nozzle channel 306 with a projecting barrier formed between the movable member 310 and the inlet 305 for restricting this movable member from being displaced toward the inlet. By electrically interconnecting this chip and a wiring board (not shown) which drives the heaters 303, the recording head is obtained.

Note here that by this method for manufacturing the recording head, furthermore, an overlying resin layer 41 and an underlying resin layer 42 made resolvable because DUV rays have been applied to destroy the intra-molecular cross-linkage bond can be stacked in construction with respect to the width direction of the element substrate 11, thus providing such a control section in the nozzle 27 as to have at least three steps. For example, even over the overlying resin layer can be formed a resin material which is photo-sensitive to lights having a wavelength of 400 nm or more, thus multi-stage nozzle construction.

Fourth Embodiment

The following will describe in detail a still further method for manufacturing the ink jet print head according to the fourth embodiment of the present invention with reference to FIGS. 15A to 17C.

Figure 15A:
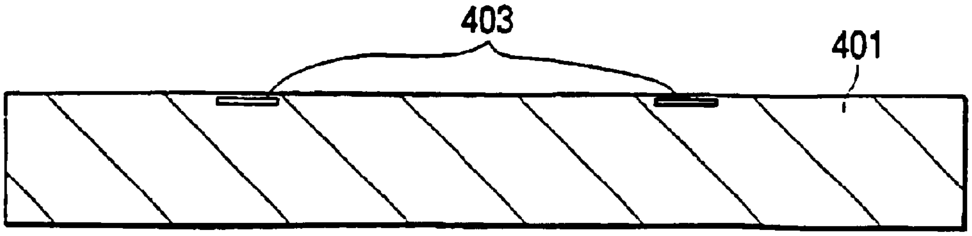
FIG. 15A is a schematic cross-sectional view for explaining the method for manufacturing the ink jet recording head according to the fourth embodiment of the present invention.

First, as shown in FIG. 15A, a silicon chip is mounted thereon by patterning etc. with a plurality of electrical thermal converting elements (heaters) 403 and a wiring (not shown) necessary to drive these heaters, thus providing a substrate 401.

Figure 15B:
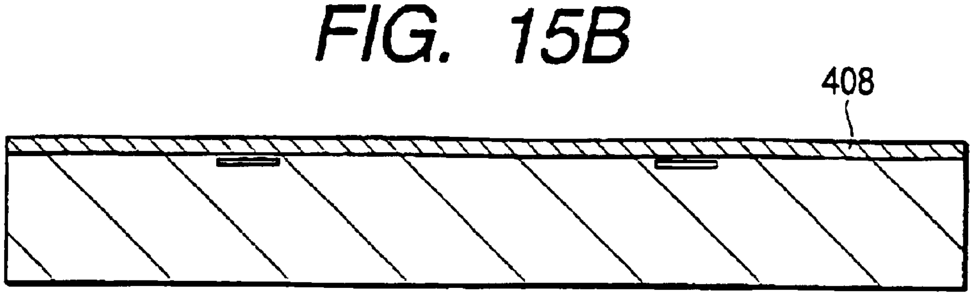
FIG. 15B is a schematic cross-sectional view for explaining a step which follows the step of FIG. 15A of the method for manufacturing the ink jet recording head according to the fourth embodiment of the present invention.
Figure 15C:
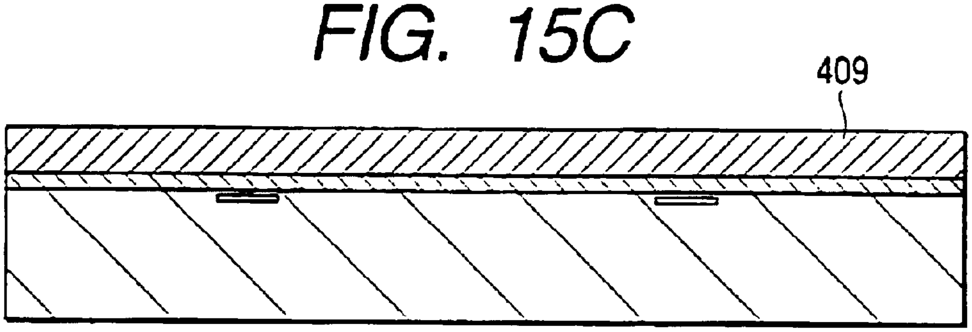
FIG. 15C is a schematic cross-sectional view for explaining a step which follows the step of FIG. 15B of the method for manufacturing the inkjet recording head according to the fourth embodiment of the present invention.
Figure 15D:
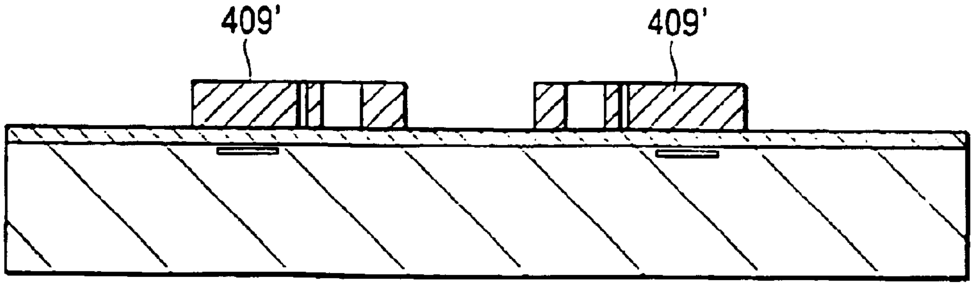
FIG. 15D is a schematic cross-sectional view for explaining a step which follows the step of FIG. 15C of the method for manufacturing the ink jet recording head according to the fourth embodiment of the present invention.
Figure 16A:
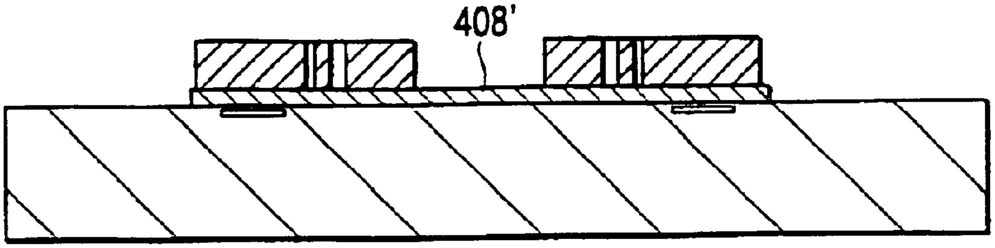
FIG. 16A is a schematic cross-sectional view for explaining a step which follows the step of FIG. 15D of the method for manufacturing the ink jet recording head according to the fourth embodiment of the present invention.
Figure 16B:
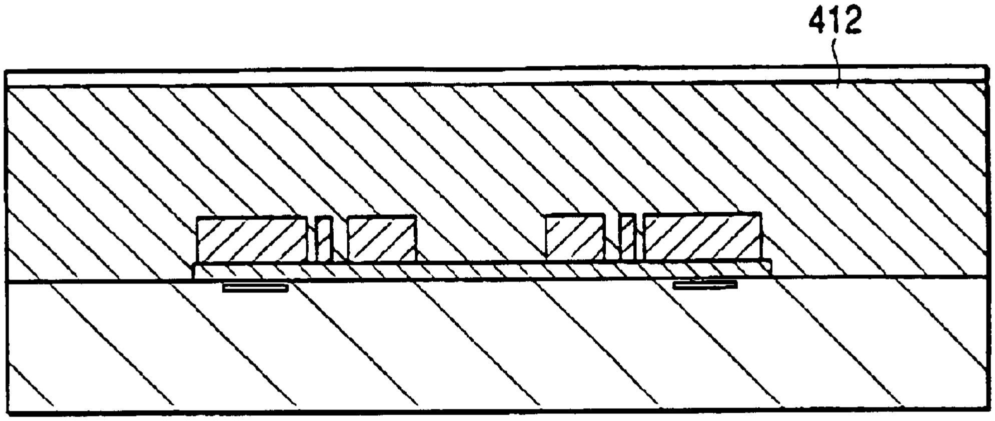
FIG. 16B is a schematic cross-sectional view for explaining a step which follows the step of FIG. 16A of the method for manufacturing the ink jet recording head according to the fourth embodiment of the present invention.
Figure 16C:
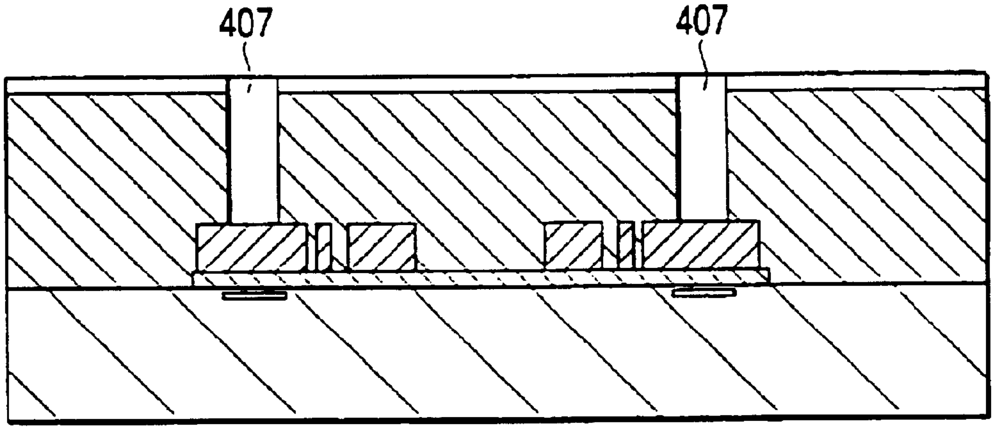
FIG. 16C is a schematic cross-sectional view for explaining a step which follows the step of FIG. 16B of the method for manufacturing the ink jet recording head according to the fourth embodiment of the present invention.

Then, as shown in FIGS. 15B and 15C, the substrate 401 is irradiated with DUV rays (ultraviolet rays having a wavelength of 300 nm or less) so that its intra-molecular cross-linkage bond may be destroyed and subsequently has resolvable resin layers 408 and 409 consecutively applied thereon by spin coating. In this step, thermal cross-linking type resin is used as a material of the underlying resin layer 408 to thus prevent interactive melting of the underlying and overlying resin layers when the overlying resin layer 409 is applied by spin coating. In this case, as a material of the underlying resin layer 408 is used a liquid obtained by resolving P(MMA-MAC=90:10) in a cyclohexanone solvent. As a material of the overlying resin layer, on the other hand is used a liquid obtained by resolving PMIPK in a cyclohexanone solvent. Then, an exposing apparatus (PLA521 made by Canon) using DUV rays is mounted with CM290 in order to use only the DUV rays having a wavelength of nearly 290 nm in the exposure and development of the overlying resin layer 409, thus forming a nozzle pattern 409' such as shown in FIG. 15D. In this case, since the ratio in photosensitivity to the DUV rays with a wavelength of nearly 290 nm is about 50:1 or more between the overlying resin layer 409 and the underlying resin layer 408, the underlying resin layer is not exposed to the rays to be patterned. Next, the same exposing apparatus is mounted with CM250 to use only the DUV rays with a wavelength of nearly 250 nm in the exposure and development of the underlying resin layer, thus forming a nozzle pattern such as shown in FIG. 16A. Subsequently, on the resin layers 408 and 409 on which such nozzle patterns are formed and which have thus been made resolvable owing to the destruction of the intra-molecular cross-linkage bond is formed a covering resin layer 412, such a portion of which as to correspond to an orifice 407 is exposed and developed using an exposing apparatus (MPA-600 made by Canon) using UV rays and removed (FIG. 16C).

Figure 17A:
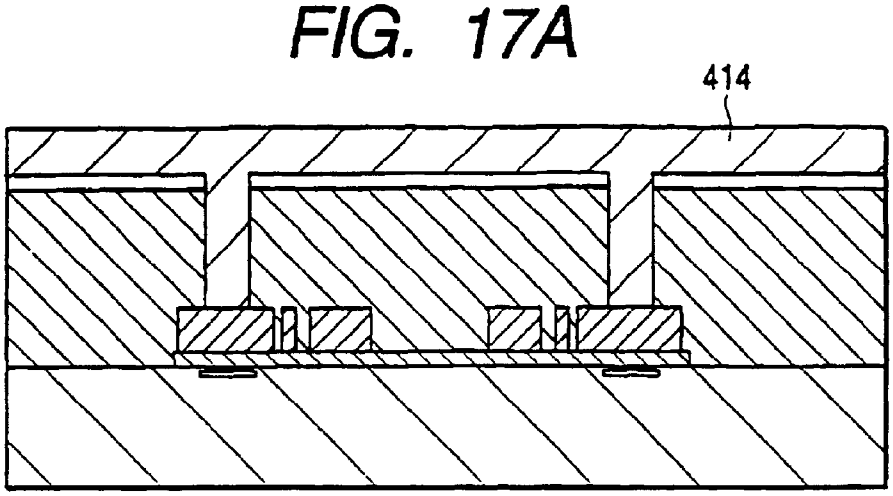
FIG. 17A is a schematic cross-sectional view for explaining a step which follows the step of FIG. 16C of the method for manufacturing the ink jet recording head according to the fourth embodiment of the present invention.
Figure 17B:
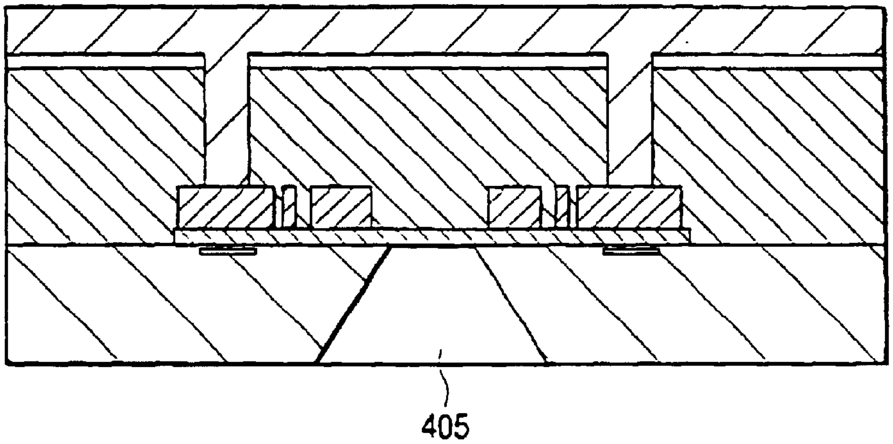
FIG. 17B is a schematic cross-sectional view for explaining a step which follows the step of FIG. 17A of the method for manufacturing the ink jet recording head according to the fourth embodiment of the present invention.

Next, as shown in FIG. 17A, an organic resin film 414 is applied to protect the orifice face side in chemical etching. Then, as shown in FIG. 17B, for example, the substrate 401 is etched chemically on its back side to form the inlet 3. More specifically, a strong alkali solution (KOH, NaOH, TMAH) is used in anisotropic etching to thereby form an inlet 405. Finally, DUV rays (ultra-violet rays with a wavelength of 300 nm or less) are applied from the surface of the element substrate 401 through the covering resin layer 412 to thereby solve out the resin layers 408' and 409', which are the nozzle patterns. It is thus possible to give an ink jet head chip provided with the orifice 407, the inlet 405, a step-shaped nozzle 406 communicating with these, a movable member 410 between the electrical thermal converting element 403 in the nozzle 406 and the inlet 405, and a control section 412' which restricts the movable member from being displaced toward the inlet. By electrically connecting this chip with a wiring board which drives the electrical thermal converting element, the ink jet recording head of the present invention can be obtained.

Figure 17C:
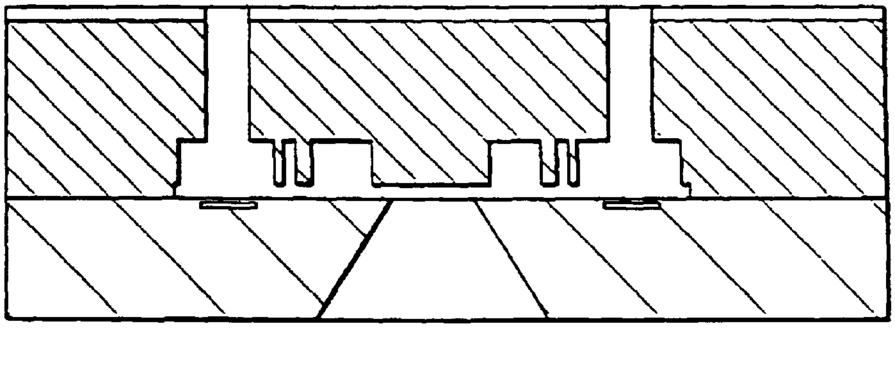
FIG. 17C is a schematic cross-sectional view for explaining a step which follows the step of FIG. 17B of the method for manufacturing the ink jet recording head according to the fourth embodiment of the present invention.
Figure 18:
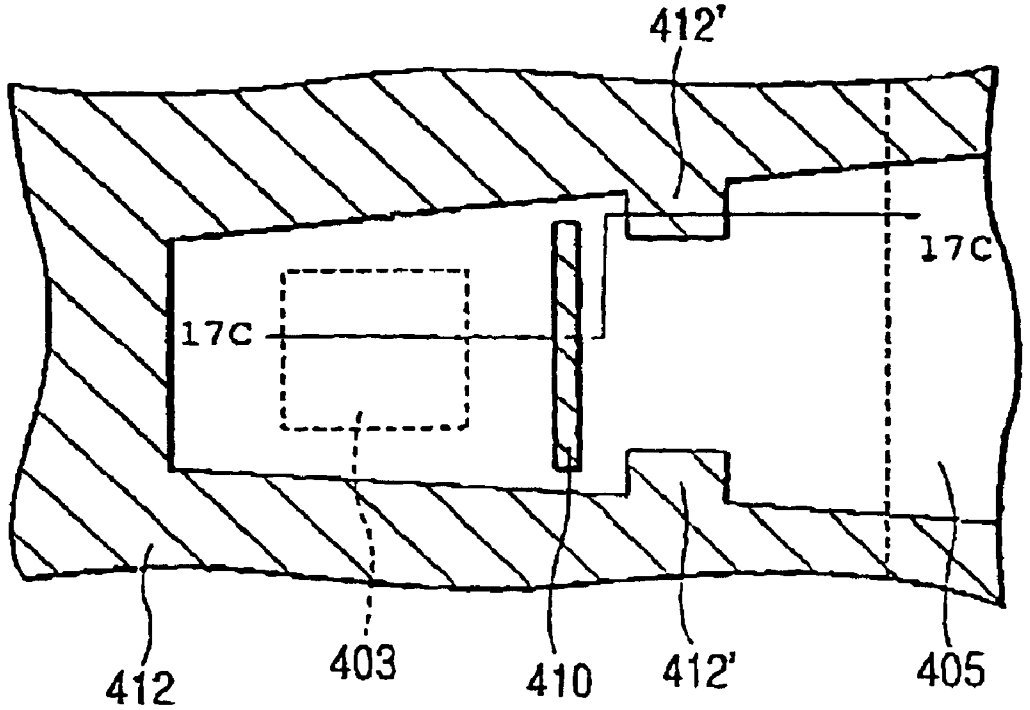
FIG. 18 is a plan view for showing a nozzle section of the ink jet recording head according to the fourth embodiment of the present invention.

FIG. 18 is a plan view of the nozzle portion of the above-mentioned ink jet recording head (FIG. 17C corresponds to a cross-sectional view taken along line 17C—17C of FIG. 18). The above-mentioned movable member 410 is formed near projecting part 412' of a side wall of the nozzle channel 406 serving as a stopper (barrier) which can restrict the movable member 410 from being displaced toward the ink inlet 405 in order to mostly close a portion extending from the movable member 410 to the orifice when a bubble is generated over the surfaces of the heaters. Preferably this barrier is small in size in order to interfere with the flowing of ink from the inlet toward the orifice as little as possible when it is refilled. Furthermore, there is a minute gap that can be given by a photolithographic process between the movable member and the nozzle wall. Preferably this gap is as small in size as possible so long as it permits the movable member to be displaced.

Figure 19A:
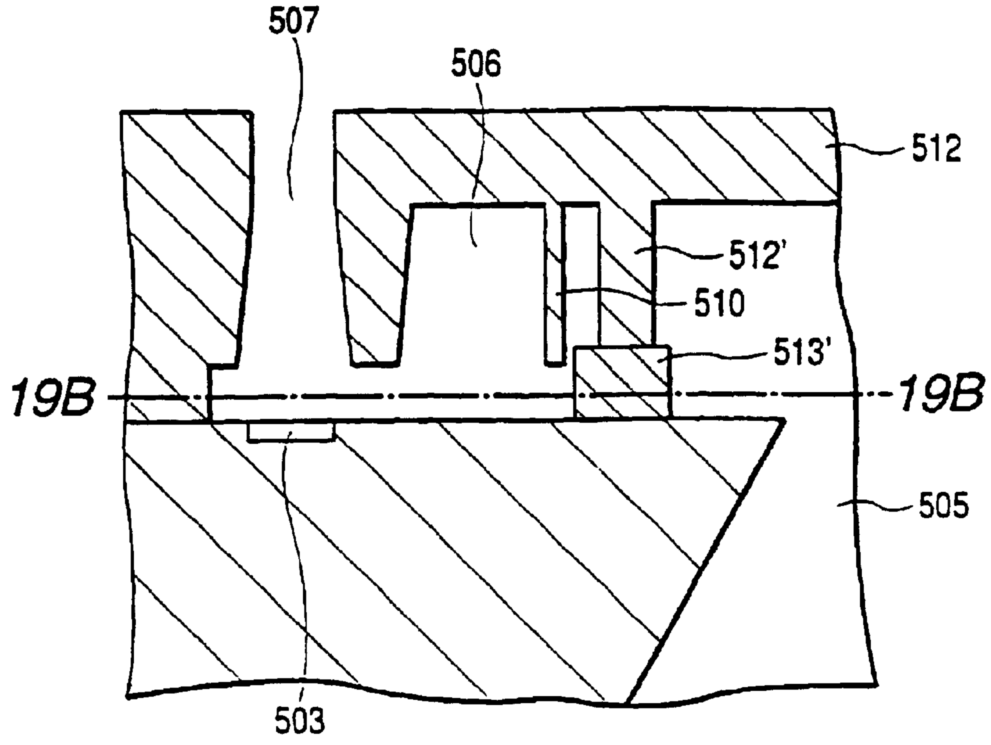
FIG. 19A is a schematic cross-sectional view for showing an ink jet recording head according to a variant of a fourth embodiment of the present invention and FIG. 19B is a schematic cross-sectional view, taken along the line of 19B—19B in FIG. 19A, for showing a head chip obtained by the variant of the fourth embodiment of the present invention.
Figure 19B:
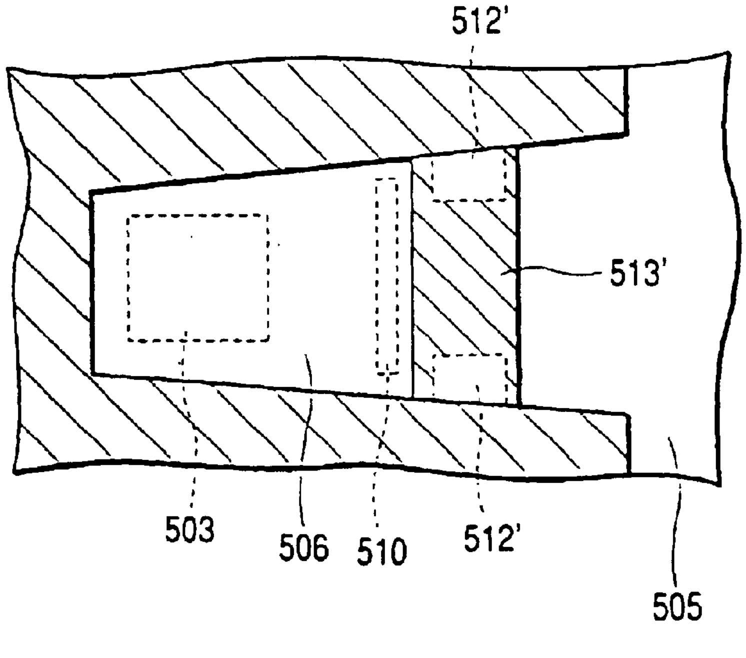

Furthermore, as in the case of an inkjet recording head shown in FIGS. 19A and 19B, not only by projecting part 512' of a side wall of a nozzle channel 506 and by forming between a movable member 510 and an ink inlet 505 as in the case of the present embodiment but also by forming a projecting barrier 513' on the substrate as in the case of the third embodiment, it is possible to further suppress the flowing of the ink toward the ink inlet 505 using a movable member 510 more effectively when a bubble is growing, further improving the discharge performance.

The following will briefly describe the operations of thus manufactured ink jet recording head (liquid discharge head) of the present invention with reference to FIGS. 20A, 20B, 21A and 21B.

Figure 20A:
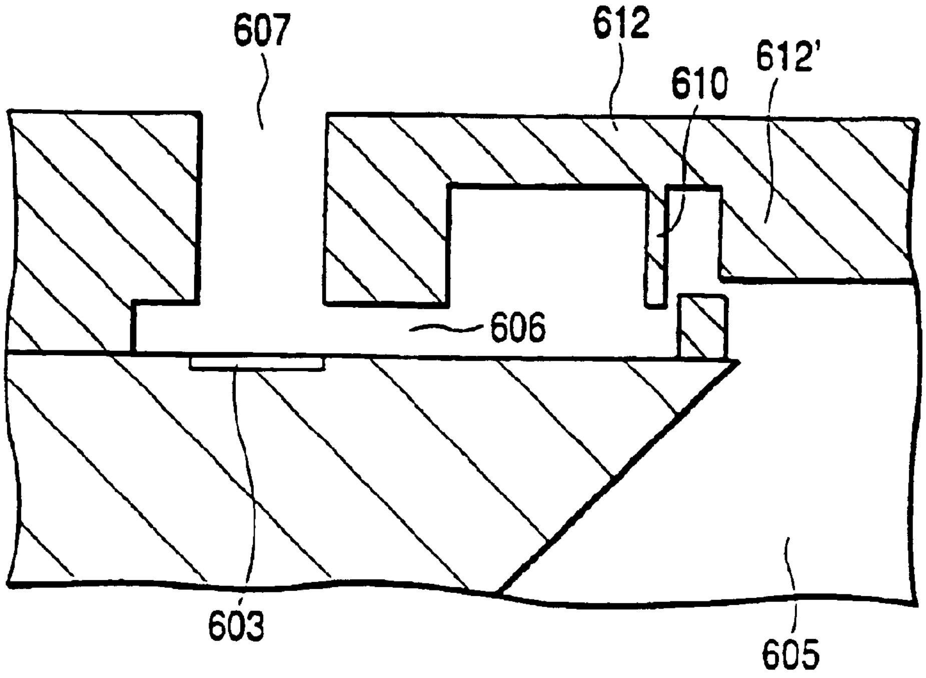
FIGS. 20A and 20B are schematic cross-sectional views for explaining an operation of discharging ink droplets using the ink jet recording head of the present invention.
Figure 20B:
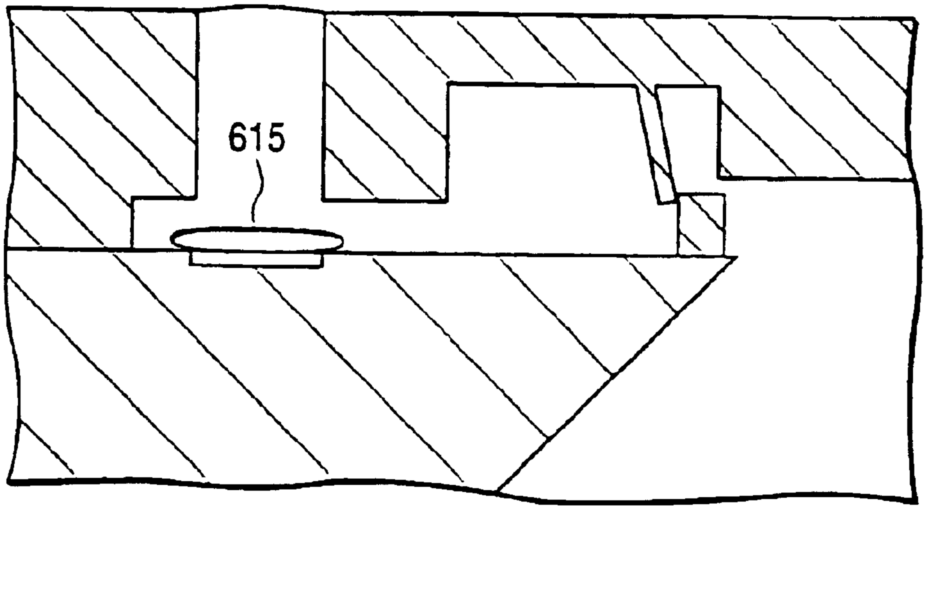

First, as shown in FIG. 20A, an orifice channel extending from the heaters to the orifice and a nozzle 606 extending from the heaters to the ink inlet are combined to form an L-shape. In the nozzle, the movable member is arranged perpendicularly to a surface of the substrate provided with the heaters on the side of the nozzle. As shown in FIG. 20B, on the other hand, when a bubble 615 is generated by the heaters, a pressure wave occurs simultaneously and ink starts to flow, to cause a movable member 610 to be inclined slightly toward an ink inlet 605, so that the nozzle is kept in a roughly closed state over a portion thereof from the orifice to the movable member, by the movable member, a projecting barrier 613' formed on the HB (substrate), and a stopper-shaped structure 612' formed behind the movable member. It is thus possible to focus the pressure over the heaters mostly on the side of the orifice in order to thereby fly a discharged ink droplet effectively. Note here that preferably a minute gap which is present between the movable member and a projecting barrier 613' is as small in size as possible in order to provide the above-mentioned roughly closed state. Furthermore, there is another minute gap between the movable member 610 and the side wall of the nozzle 606.

Figure 21A:
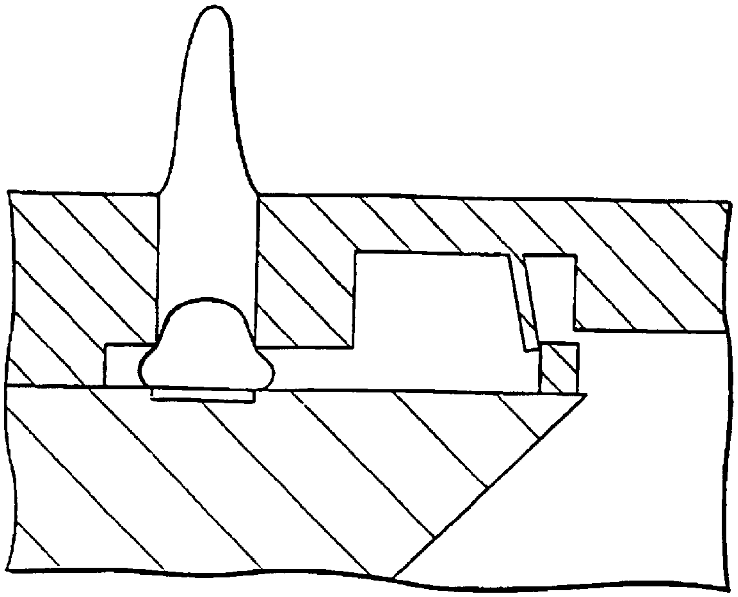
FIGS. 21A and 21B are schematic cross-sectional views which follow FIGS. 20A and 20B for explaining the operation of discharging ink droplets using the ink jet recording head of the present invention.
Figure 21B:
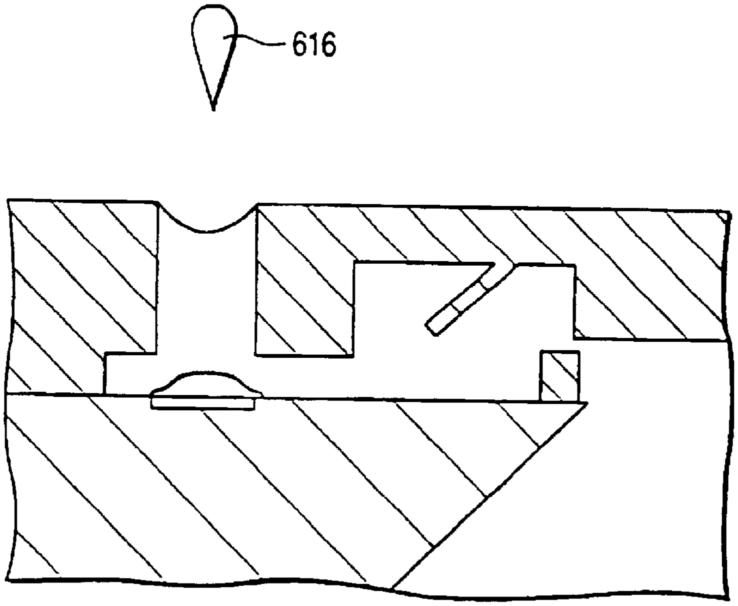

Now, as shown in FIG. 21A, since the nozzle is roughly closed by the movable member 610, the projecting barrier 613', and the stopper-shaped structure 612', the bubble grows larger toward the orifice to thereby enable flying the ink droplet from the orifice in a more stable manner and more effectively. As shown in FIG. 21B, subsequently, when the bubble starts disappearing over the heaters, the movable member 610 starts to be displaced toward the orifice 607. Then, the movable member 610 is displaced greatly toward the orifice. In this case, a displacement of the movable member toward the orifice is larger than that thereof toward the ink inlet at the time of bubble growing. The ink is thus refilled speedily into a plurality of the ink nozzles 606 from the ink inlet 605. Note here that when the bubble is generated the ink is inhibited from flowing toward the inlet 605 by the movable member 610, the projecting barrier 613' formed on the HB (substrate) 601, and the stopper structure 612' formed behind the movable member, so that the quantity of the ink refilled into the nozzles 606 can be reduced to a minimum nearly equal to the volume of the ink flown (discharged).

What is claimed is:

1. A method for manufacturing an ink jet recording head comprising an exothermic resistor, an ink orifice provided in correspondence to the exothermic resistor, and a nozzle channel communicating with the ink orifice, with a movable member formed in the nozzle channel between the exothermic resistor and an ink inlet for supplying ink into the nozzle channel in such a configuration that a bubble generated in the ink in the nozzle channel by heat generated by the exothermic resistor is utilized to discharge the ink from the ink orifice, said method comprising the steps of:

preparing a substrate provided with the exothermic resistor;

applying a first resin on the substrate so as to provide a first mold shape for forming the nozzle channel and said the movable member;

forming the first mold shape using the first resin;

applying, on the substrate, a second resin over the first mold shape for forming the nozzle channel and the movable member; and removing the first mold shape.

2. The method according to claim 1, wherein the first resin is a photo-resist, and said step of forming the first mold shape includes a step of using a mask pattern having a width not larger than a resolution limit of the photo-resist to form the movable member from the first mold shape.

3. The method according to claim 1, wherein said step of applying the first resin is preceded by a step of applying a third resin which provides a second mold shape used to form the nozzle channel on the substrate, and said step of applying the first resin involves applying the first resin on the substrate in such a manner as to cover the second mold shape.

4. The method according to claim 1, wherein said step of applying the first resin is preceded by a step of forming a projecting barrier at a position between the movable member and the ink inlet on the substrate.

* * * * *

UNITED STATES PATENT AND TRADEMARK OFFICE
CERTIFICATE OF CORRECTION

PATENT NO. : 6,971,171 B2
APPLICATION NO. : 10/645582
DATED : December 6, 2005
INVENTOR(S) : Hirokazu Komuro et al.

It is certified that error appears in the above-identified patent and that said Letters Patent is hereby corrected as shown below:

ON THE TITLE PAGE
At Item (57), Abstract, line 4, “manufacturing” should read --of manufacturing--.
At Item (57), Abstract, line 9, “substrate, second” should read --substrate, a second--.

COLUMN 4
Line 64, “head.” should read --head--.

COLUMN 9
Line 8, “nearly 020” should read --nearly 0°--.

COLUMN 12
Line 22, “said” should be deleted.

Signed and Sealed this

Twentieth Day of November, 2007

JON W. DUDAS
*Director of the United States Patent and Trademark Office*